Nov. 24, 1953

C. H. VLACHOS 2,660,123

THERMOHYDRAULIC POWER CONVERTER

Filed Aug. 11, 1952

INVENTOR
Constantinos H. Vlachos

BY *Glenn L. Fish*

ATTORNEY

Nov. 24, 1953  C. H. VLACHOS  2,660,123
THERMOHYDRAULIC POWER CONVERTER
Filed Aug. 11, 1952  2 Sheets-Sheet 2

INVENTOR
Constantinos H. Vlachos

BY *Glenn L. Fish*

ATTORNEY

Patented Nov. 24, 1953

2,660,123

UNITED STATES PATENT OFFICE 2,660,123

THERMOHYDRAULIC POWER CONVERTER

Constantinos H. Vlachos, Vancouver, Wash.

Application August 11, 1952, Serial No. 303,790

1 Claim. (Cl. 103—118)

This invention is a power converter.

It is one object of the invention to provide a power converter which is particularly adapted to convert the potential energy from a gas under pressure to a liquid under pressure.

Another object of the invention is to provide a power converter which is simple in construction and may be manufactured at low cost and is not liable to get out of working order.

Another object of the invention lies in the provision of a power converter which utilizes piston carrying rotors which are adapted to use the fluid driving the motors or being driven by the pump to radially move the pistons into proper engagement with their working surfaces.

These and other objects of the invention will become apparent during the course of the following description.

In the accompanying drawings, forming a part of this specification, like numerals are employed to designate like parts.

Figure 1:
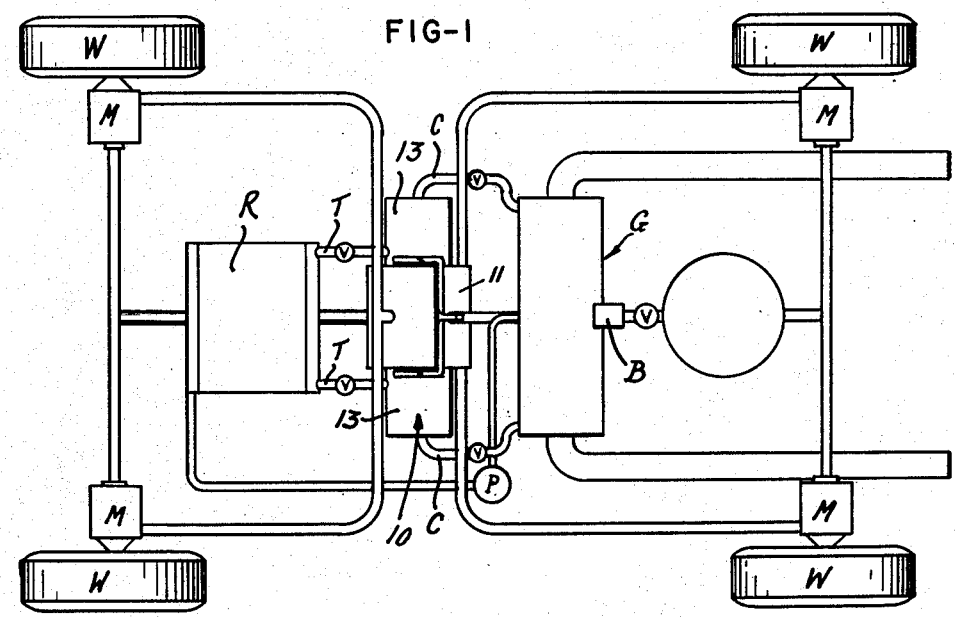
Figure 1 is a diagrammatic view of one application of the invention comprising the subject matter of this application.

The power converter of this invention is provided with a housing 10 having an enlarged intermediate portion 11, which houses a power generator or fluid pump 12, and spaced axially aligned reduced portions 13 which house fluid or gas driven motors 14.

Referring to Figure 1, it will be seen that fluid motors M are secured to drive the four wheels W of a vehicle and are connected to the discharge sides 15 of the fluid pump 12. The fluid driven thereby is thus forced through the motors M to effectively power the four wheels.

A gas pressure generator G produces a fluid pressure as by a burner B or the like and this fluid under pressure enters the motors 14 through conduit C threadedly engaged in removable heads 16 and causes them to rotate. The escaping gas is exhausted through tubes T through a condenser R from whence it is returned to the generator G for another cycle. Of course adequate valves and controls are provided for accomplishing the desired speed control and other necessary objects.

Referring now more particularly to the power converter, it will be seen that the pump 12 has a base 17 which is drilled and tapped to receive anchoring bolts for mounting the converter.

An oblong socket 18 is formed in the housing 11 from its open end and extends longitudinally into the body terminating in a faced end wall 19. The side walls 20 of socket 18 are polished or faced to present a smooth working surface for the cooperating parts. Radially extending, internally threaded and diametrically opposed ports 15 and 21 are provided in the housing 11 and communicate with socket 18. Each port is spaced from its adjacent ports 90 degrees on centers, thus providing four of said ports.

Figure 5:
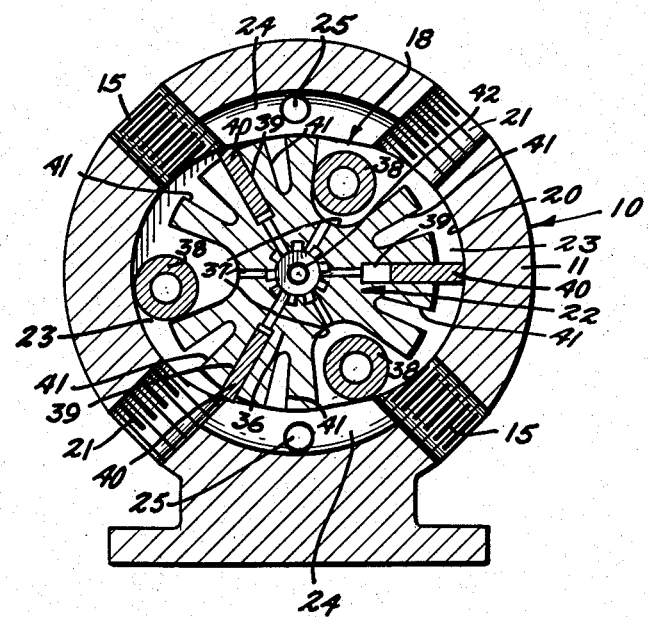
Figure 5 is a transverse cross section as at line 5—5 of Figure 2.

As indicated in Figure 5, when the greatest transverse dimension of socket 18 is horizontal, the ports 15 and 21 are positioned 45 degrees above and below horizontal one at each side of a longitudinal vertical plane. Of course, socket 18 may be positioned at any angle desired and the ports will then be provided in the same position relative to the socket.

Piston carrier or rotor 22 is substantially circular in transverse cross section, as seen in Figure 5, and when positioned centric of socket 18, defines crescent shaped chambers 23 between the rotor and housing 11. Ports 15 and 21 thus open into socket 18 adjacent the extreme ends of chambers 23. It will be noted that the opposed ends of chambers 23 have opposite ports 15 and 21. That is, one end has an inlet port 15 while the opposed end of the same chamber has an outlet port 21, and the opposed chambers 23 on their corresponding upper or lower ends have opposite ports.

Between the ports of the corresponding ends of opposed chambers 23, I have provided by-pass grooves 24 which communicate with socket 18 throughout their length, and midway the length of said grooves, I have provided conduits 25 communicating with said grooves and extending longitudinally of the housing 11. Conduits 25 terminate at their rear ends in a vertically extending conduit 26 which communicates midway its length with an annular well 27.

About the mouth of socket 18, I have provided a recess 28 in face 29, and a matching boss 30 carried by cover plate 31 is fitted therein. A gasket or sealing ring 32 encircles the boss 30 and is clamped between face 29 and cover plate 31 to seal the socket against leaking. The longitudinal movement of boss 30 into socket 18 is limited by reason of shoulders defined by the recess 28, thus providing a proper final longitudinal dimension for socket 18. A packing gland 33 is formed in cover plate 31 coaxial with socket 18 and provides a bearing and seal for stub shaft 34 splined into piston carrier or rotor 22. Multiple stud bolts 35 pass through spaced openings in cover plate 31 and thread into housing 11 to secure the plate thereon.

Rotor or piston carrier 22 is provided with radially disposed longitudinally extending multiple slots about its periphery. As indicated in Figure 5, the rotor has a hub 36 and spaced on centers every 120 degrees about the periphery of the hub are roller receiving slots 37 having tubular roller pistons 38 therein and positioned about the hub 60 degrees from slots 37 are vane receiving slots 39 also occurring every 120 degrees about the hub from each other. Vane pistons 40 are carried by slots 39 and are slidable therein. Positioned intermediate each piston receiving slot 37 and 39 I have provided compression slots 41.

Concentric with hub 36, I have provided a spline bore 42 adapted to fit over splines 34' of stub shafts 34 and forms a conduit through the hub 36. Radially extending conduits 43 communicate with the bore 42 and at their outer ends communicate with the piston receiving slots 37 and 39 midway their lengths.

The cover plate 31 is provided with a diametric conduit 44 which communicates with conduits 25 and terminate at the center of the cover with an annular well 45. Each splined stub shaft 34 has a conduit drilled therein communicating the bore 42 with its cooperating well 45 or 27. Cover plate 31 carries the housing 13 as does the opposed end of housing 11 and since the two motors 14 are identical the description of one will suffice. Shafts 34 may be an integral part of motor rotor 46 or it may be keyed therein as at 47. In each motor, there are eight equally spaced vanes or blades 48 and a rotor 49 serving as a carrier for the vanes. This rotor is of cylindrical form and comprises a hub portion 50 which is provided with equally spaced slots 51, which slots are provided at the bottom with a taper 52 and which slots are adapted to slidingly receive the blades. The rotor 49 is also provided with an extending shaft 34 at one end, and at the other end, with a concentrically projecting boss 53. The slots 51 extend through the boss and the greatest depth of the slots is at the boss end. Forced on to this boss is a washer 54, the thickness of the washer corresponding to the length of the boss and the diameter of the washer being greater than that of the hub, so that it forms a projecting flange. When the washer is thus assembled, the slots in the boss form holes 55 (Fig. 2) leading from the root of the vane slots to the exterior of the washer. There is also provided a shell 56 for the rotor, the shell being bored in two stepped diameters and faced at the end of the largest diameter. The smaller bore 57 is concentric and of a size adapted to loosely receive the shaft 34 of the rotor, and the larger bore 58 is oblong in the form of a socket, which socket receives the rotor and is covered by the flange of the washer 54. The periphery of this housing is of conical form, the greatest diameter of the cone being at the faced or washer end 59. The outer or conical periphery of the housing serves as a valve for four radial ports 60. There is a 60 degree spacing between the ports, and the vanes are 45 degrees apart, so that there are always two blades between the ports.

When the rotor is in place, by inserting its shaft into the shaft hole 59, pressure from the washer end of the carrier will force the hub against the bottom of the socket and will force the flange against the faced end of the shell, so that there will be two crescent shaped chambers formed between the rotor and shell, the end walls of which chambers will be formed, one from the shell and the other from the flange or shroud-like extension of the washer.

The fluid pressure enters longitudinally and is directed against the exterior of the washer with a consequent passage through the holes 55 to beneath the vanes, the resultant being that the vanes are forced outwardly and also by reason of the end pressure are forced longitudinally against the bottom of the socket. The resultant is that all points of the rectangular chamber are sealed and are yieldingly held in permanently sealed relation against wear.

The housing 13 is internally bored at 61 with a conical hole forming a valve seat for the external valve surface of the housing. Internally of the housing 13 and running longitudinally are two pairs of channels 62 and 63, the channels of each pair being diametrically opposed. The channels lead from over the ports when the housing and shell are assembled, one pair of the channels leading toward one end of the housing, and the other pair leading toward the other end of the housing.

There is provided in the housing an annulus 64 into which, when assembled, one pair of the shell channels lead, the annulus forming a connecting conduit to connect such channels. In the housing 13 is a pipe hole 65 which leads into an internal annulus 66 of the housing, which internal annulus co-mates with an annulus 64 in the shell. The other pair of channels leads to the flanged ends of the device where chambers 65 are formed, which chambers are closed by heads 16 screwed into pipe threads 66 internal of the housings 13, which threads are of a diameter permitting the passage or insertion of the housing, so that when a fluid under pressure is admitted through the pipe connection at this point, the fluid is directed against the washer and also passes through one pair of the shell channels and thence through one pair of the ports; but if the shell 56 is turned 90 degrees in relation to the housing, then the fluid passes through the other pair of ports, thus reversing the direction of rotation or the rotor. A lever 67 is provided on the shell 56 and extends outwardly of the housing 13 for reversing the motor.

Figure 2:
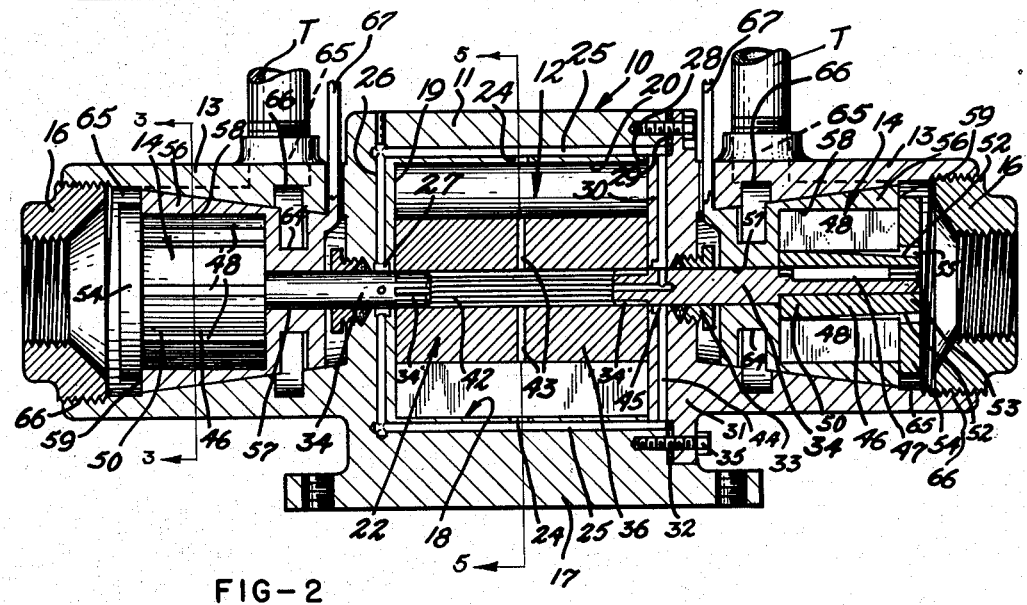
Figure 2 is a vertical cross section taken longitudinally through the power converter.
Figure 3:
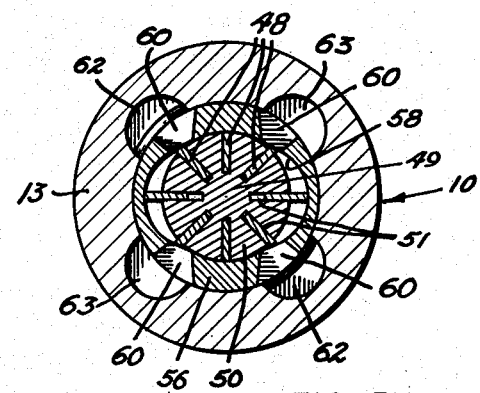
Figure 3 is a transverse cross section as at line 3—3 of Figure 2.
Figure 4:
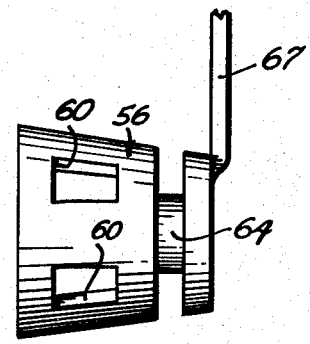
Figure 4 is a side elevation of a shell forming a part of a motor.

Inspection of Figure 2 will reveal that the stub shafts 34 are splined at 34' into each end of the bore 42 uniting both motors 14 to rotate with the pump 12 as a unit.

Having thus described my invention, I claim:

In a power converter having rotary gas powered motors one at each end and an intermediate rotary hydraulic pump uniting said motors, a housing comprising a base, an intermediate socket having an oblong shape transversely thereof and adapted to receive the rotor of said pump and define opposed chambers between the housing and said rotor, an open end on said socket, a closure for said open end, an inwardly tapered axially aligned socket in said closure and adapted to contain one of said motors, a reduced end portion on the housing opposed to said closure, an inwardly tapered axial socket in said end portion adapted to contain the other of said motors, and inlet and outlet ports in the housing for each motor and pump.

CONSTANTINOS H. VLACHOS.

References Cited in the file of this patent

UNITED STATES PATENTS

| Number | Name | Date |
|---|---|---|
| 883,888 | Keller | Apr. 7, 1908 |
| 1,038,075 | Berrenberg | Sept. 10, 1912 |
| 1,132,747 | Sundh | Mar. 23, 1915 |
| 1,189,766 | Wilkin | July 4, 1916 |
| 2,439,241 | Curtis et al. | Apr. 6, 1948 |

FOREIGN PATENTS

| Number | Country | Date |
|---|---|---|
| 662,535 | France | Mar. 19, 1929 |